United States Patent [19]

Muchmore et al.

[11] Patent Number: 5,401,213

[45] Date of Patent: Mar. 28, 1995

[54] CLUTCH AND DAMPER ASSEMBLY

[75] Inventors: Robert A. Muchmore, West Chester; Gerald C. Danielewicz, Dayton; Wayne L. Spitler, Ludlow Falls; Randy L. Melanson, Waynesville, all of Ohio

[73] Assignee: General Motors Corporation, Detroit, Mich.

[21] Appl. No.: 13,513

[22] Filed: Feb. 4, 1993

[51] Int. Cl.$^6$ ................................................ F16D 3/14
[52] U.S. Cl. .......................................... 464/68; 464/64
[58] Field of Search ...................... 464/64, 66, 67, 68; 192/106.2

[56] References Cited

U.S. PATENT DOCUMENTS

| Re. 33,984 | 7/1992 | Spitler | 192/106.2 |
|---|---|---|---|
| 4,101,015 | 7/1979 | Radke | 192/106.2 |
| 4,274,525 | 6/1981 | Raab et al. | 192/106.2 |
| 4,572,345 | 2/1986 | Frietsch | 192/106.2 |
| 4,709,797 | 12/1987 | Cucinotta et al. | 192/106.2 |
| 4,787,877 | 11/1988 | Nagao et al. | 464/64 |
| 4,887,485 | 12/1989 | Kobayashi | 192/106.2 |
| 5,064,041 | 11/1991 | Graton et al. | 192/106.2 |
| 5,163,875 | 11/1992 | Takeuchi | 192/106.2 |

Primary Examiner—Daniel P. Stodola
Assistant Examiner—Eileen A. Dunn
Attorney, Agent, or Firm—Donald F. Scherer

[57] ABSTRACT

A damper assembly for a friction clutch has a plurality of springs trapped in a cage member. The springs provide a resilient drive connection between input and output members of the clutch damper. The input member of the clutch damper is a pressure plate on which a friction surface is disposed. The output member is a hub which is connected to the output shaft of a torque converter. Embossments are formed on the members of the damper, such as the cage, the input or output member, to provide friction hysteresis between relatively rotatable members of the damper. The normal force for the friction hysteresis is established by a washer spring which is positioned by embossments also formed on one of the damper members. The angular excursion permitted by the damper springs is limited by openings formed in one damper member and tabs formed on another damper member.

3 Claims, 5 Drawing Sheets

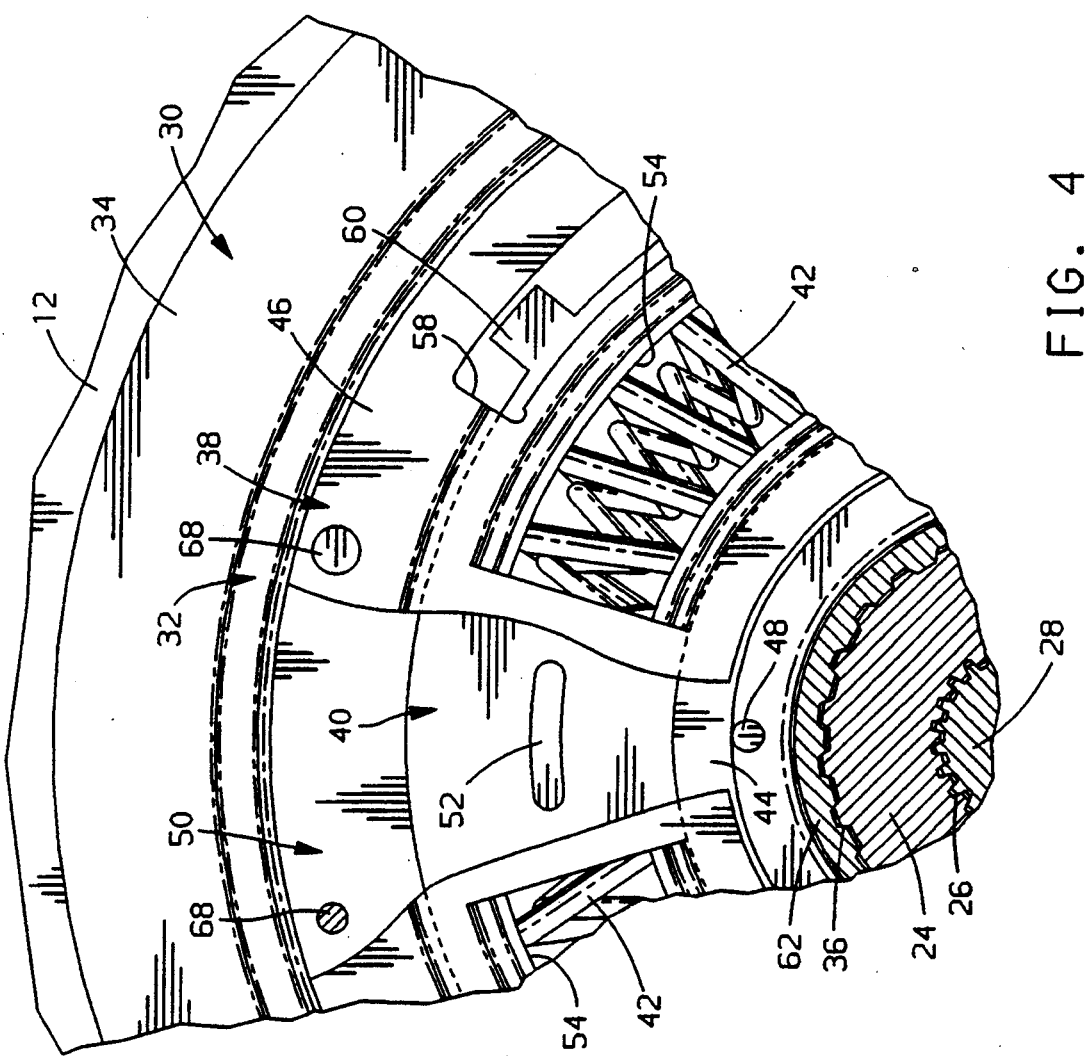
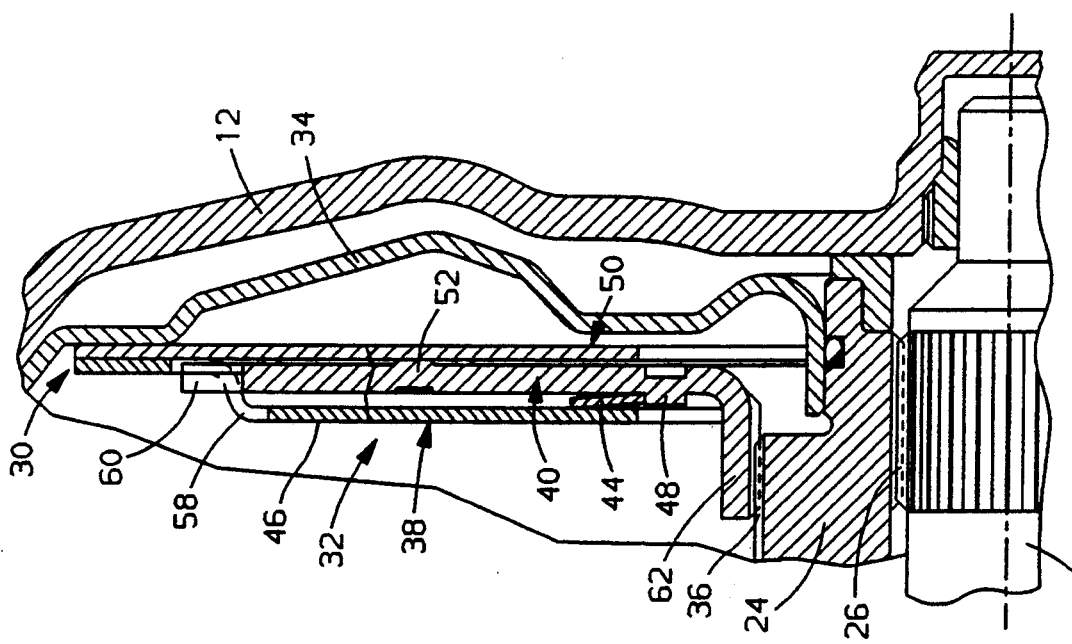

CLUTCH AND DAMPER ASSEMBLY

TECHNICAL FIELD

This invention relates to friction clutch dampers, and more particularly, to damper assemblies providing frictional hysteresis and limited angular excursion.

BACKGROUND OF THE INVENTION

As is well known, friction clutches, which are disposed in a torque transmitting relationship between an internal combustion engine and a transmission, have a spring damper assembly which is operable to limit the transmission of torsional disturbances between the engine and the transmission. Spring damper assemblies generally have a plurality of caged spring members which are disposed between the input and output members of a damper. The caged spring members are limited in their travel, generally due to design. This travel limit controls the angular excursion permitted within the damper assembly. The limits of angular excursion are generally provided by rivet members which are secured to the spring cage and aligned with fingers or tabs on the output hub of the damper.

Also, as is well known, these damper assemblies include a frictional hysteresis characteristic. The frictional hysteresis is generally a result of friction plates disposed between adjacent members of the damper assembly which are relatively rotatable. The amount of friction hysteresis is controlled either by a spring member providing a normal force or by assembly forces which are present within the damper assembly. The more usual and consistent means of establishing the frictional hysteresis force is the use of a washer spring which compresses frictional plates between the adjacent members.

SUMMARY OF THE INVENTION

The present invention seeks to reduce the manufacturing complexity, cost and assembly of the spring dampers. The present assembly provides for embossments within one of the damper members, such as the output hub, which establish a support and locating surface for a washer spring and provide a pad to fractionally engage the cage member, such that the frictional hysteresis is provided.

The embossments are established on the output hub at the time of its manufacture and do not require other operating or manufacturing techniques other than the normal stamping techniques. Also at the time of manufacture, the output hub has a plurality of stop tabs either formed by embossments or formed at the outer periphery of the damper output hub. The tabs are aligned in windows, at assembly, in the spring cage. The windows are formed in the spring cage member during the stamping process for these members, thus there is a reduction in the overall manufacturing requirements and in the number of parts which are utilized within the damper assembly.

It is therefore an object of this invention to provide an improved damper assembly, wherein embossments are formed on one of the damper members to provide locating and support surfaces for a washer spring disposed within the damper assembly.

It is another object of this invention to provide an improved damper assembly, wherein embossments in one of the damper members is provided during manufacture thereof and cooperates with an adjacent member to provide a frictional hysteresis between the damper members.

It is a further object of this invention to provide an improved damper assembly, wherein a frictional hysteresis is provided by embossments formed in one member, and also wherein, the one member is urged into frictional contact with another damper member by a washer spring which is supported and located on embossments formed in one of the damper members.

It is still another object of this invention to provide an improved damper assembly, wherein the damper components have integrally formed thereon a plurality of locating and stop members which cooperate to provide limited angular excursion within the damper and support and locating means for frictional damping.

These and other objects and advantages of the present invention will be more apparent from the following description and drawings.

DESCRIPTION OF THE DRAWINGS

FIG. 3 is an enlarged view of a portion of FIG. 1 showing the embossment features of the present invention incorporated within the damper.

FIG. 4 is a side view of the portion of the damper shown in FIG. 3 with parts of the spring cage removed to permit a unrestricted view of some of the features of the damper.

DESCRIPTION OF THE EMBODIMENTS

Figure 1:
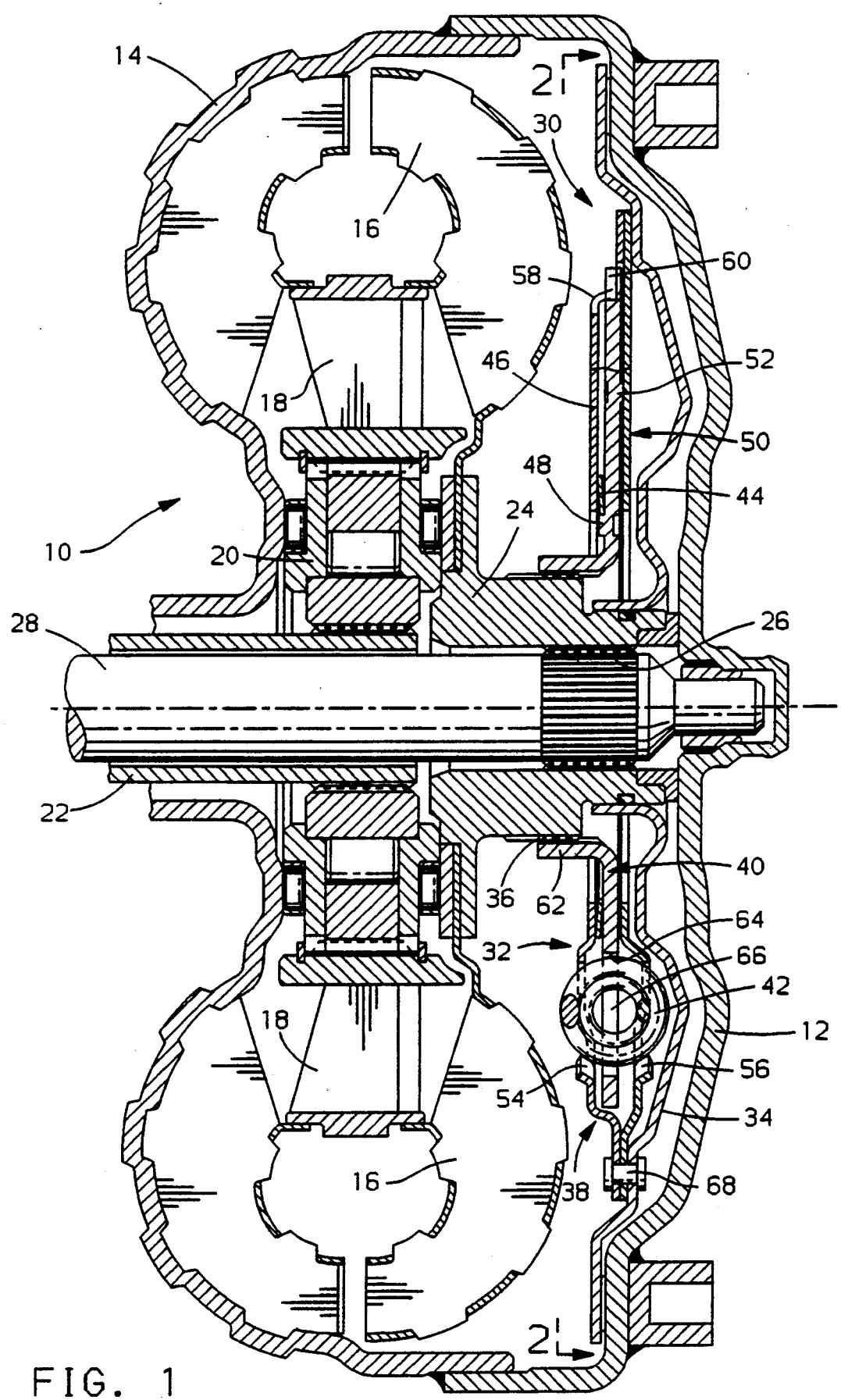
FIG. 1 is a sectional view taken along line 1—1 of FIG. 2 depicting an embodiment of a spring a damper assembly disposed within a torque converter assembly.

Referring to the drawings, wherein like characters represent the same or corresponding parts throughout the several views, there is seen, particularly in FIG. 1, a torque converter and damper assembly generally designated 10. The torque converter is a conventional drive transmitting device including an input shell 12 welded to an impeller 14 which is disposed for toroidal fluid communication with a turbine 16 and a stator 18.

The stator 18 is drive connected through a one-way device 20 to a sleeve shaft 22 which is grounded to the transmission housing, not shown. The turbine 16 includes an output hub 24 which is splined at 26 to an output shaft 28. As is well known, the output shaft 28 of the torque converter 10 provides an input for a multi-speed transmission. The torque converter 10 operates in a well-known manner to provide drive from an engine, not shown, to the transmission and rear wheels of a vehicle, not shown. The torque converter 10 is a fluid drive and therefore accommodates the torsional disturbances which are produced at the engine due to the firing frequency of the pistons.

To improve the operating efficiency of the torque converter, a torque converter clutch 30 is provided to establish a direct drive connection between the input shell 12 and the output shaft 28. As is well known, the torque converter clutch 30 can be fluid operated and provide a frictional engagement for transmitting the torque from the engine to the transmission. However, it is also well known in these types of torque transmitting connections; i.e., clutches, will transmit torsional disturbances which are found in the driveline at the engine interface.

To accommodate and reduce the amount of torsional vibration transmitted to the shaft 28, a damper assembly, generally designated 32, is provided. The damper assembly 32 is connected between a pressure plate 34 of the clutch 30 and a spline 36 formed on the hub 24. Thus, when the clutch is engaged, a drive connection is provided through the pressure plate 34 and the damper assembly 32 to the hub 24.

The damper assembly 32 includes a spring cage, generally designated 38, and output hub 40 and a plurality of spring packs 42. The spring packs 42 permit relative rotation or angular excursion between the cage 38 and the hub 40. This angular excursion reduces the tendency to transmit torsional vibrations within predetermined frequency ranges.

Figure 2:
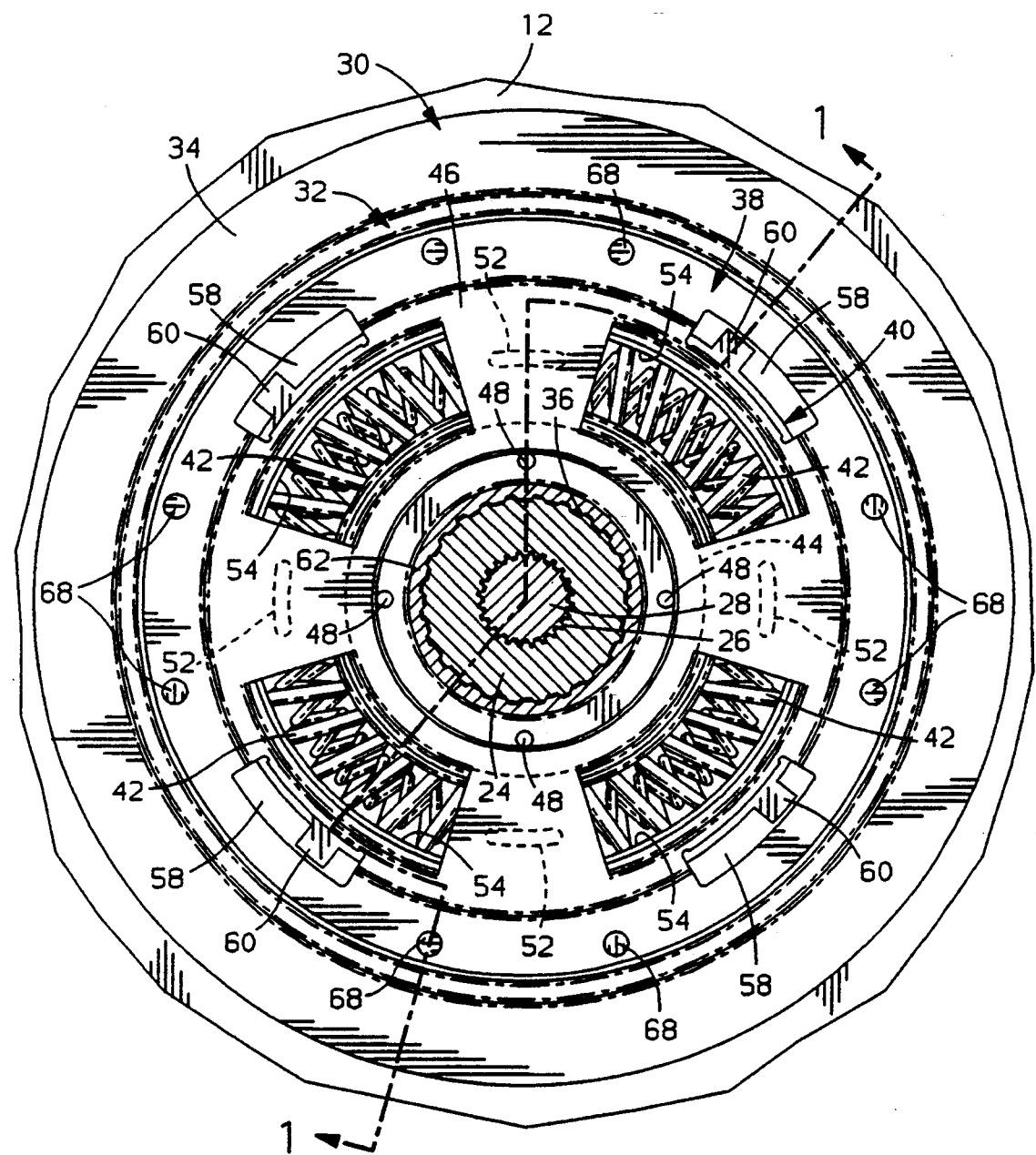
FIG. 2 is a view taken along line 2—2 of FIG. 1.

In order to reduce the period of time that the spring packs 42 will vibrate or compress, a frictional hysteresis is provided. The force for the frictional hysteresis is provided by a washer or Belleville spring 44 which is trapped between the hub 40 and a first wall 46 of the spring cage 38. The hub 40 has embossed thereon support embossments 48 which are effective to locate and radially support the washer spring 44. The washer spring 44 urges the separation between the wall 46 and the hub 40 such that the hub 40 is urged toward a second wall 50 of the spring cage 38. The hub 40 also has embossed thereon a plurality of friction embossments 52. As best seen in FIGS. 2 and 4, the friction embossments 52 are essentially oblong in end view and provide a pad which abuts the wall 50 of the spring cage 38.

The walls 46 and 50 of the spring cage 38 are preferably stamped from metal and, during the stamping process, have windows 54 and 56 stamped in their respective walls 46 and 50. These windows provide for the entrapment of the spring packs 42 within the spring cage 38. As best seen in FIG. 2, the spring packs 42 are equiangularly spaced relative to the spring cage 38.

The wall 46 of the spring cage 38 also has stamped therein, at the time of manufacture, a window or aperture 58 which cooperates with tabs 60 formed on the hub 40. Thus, at the time of manufacture of the spring cage 38, the necessary elements for providing hysteresis, spring entrapment and excursion stops are provided.

The hub 40 is also a stamped and drawn member, such that the inner portion 62 is formed with a spline for connection with the spline 36 and a flat annular portion is provided to cooperate with the spring packs 42. The hub 40 has a plurality of windows 64 formed therein to also enclose the spring packs 42. The windows 64 have an end wall 66 which abut the ends of the spring packs 42 during angular excursion between the hub 40 and the spring cage 38. The spring packs 42 are compressed during this angular excursion between one end of the windows 54,56 and one of the walls 66 of the hub 40. This operation of spring dampers is well known.

The output hub 40 also has formed, at the time of manufacture, the support embossments 48 and the friction embossments 52, as well as the tabs 60. Thus, the necessary elements for providing the advantages of the present invention are formed at the manufacture of the individual components and do not require extra manufacturing means nor do the require the addition of other components.

The spring cage 38, spring packs 42 and output hub 40 are assembled and then spring cage 38 is connected with the pressure plate 34 by a plurality of rivets 68. Thus assembled, the clutch assembly 30 is ready for positioning within a torque converter at the time of torque converter assembly.

Figure 6:
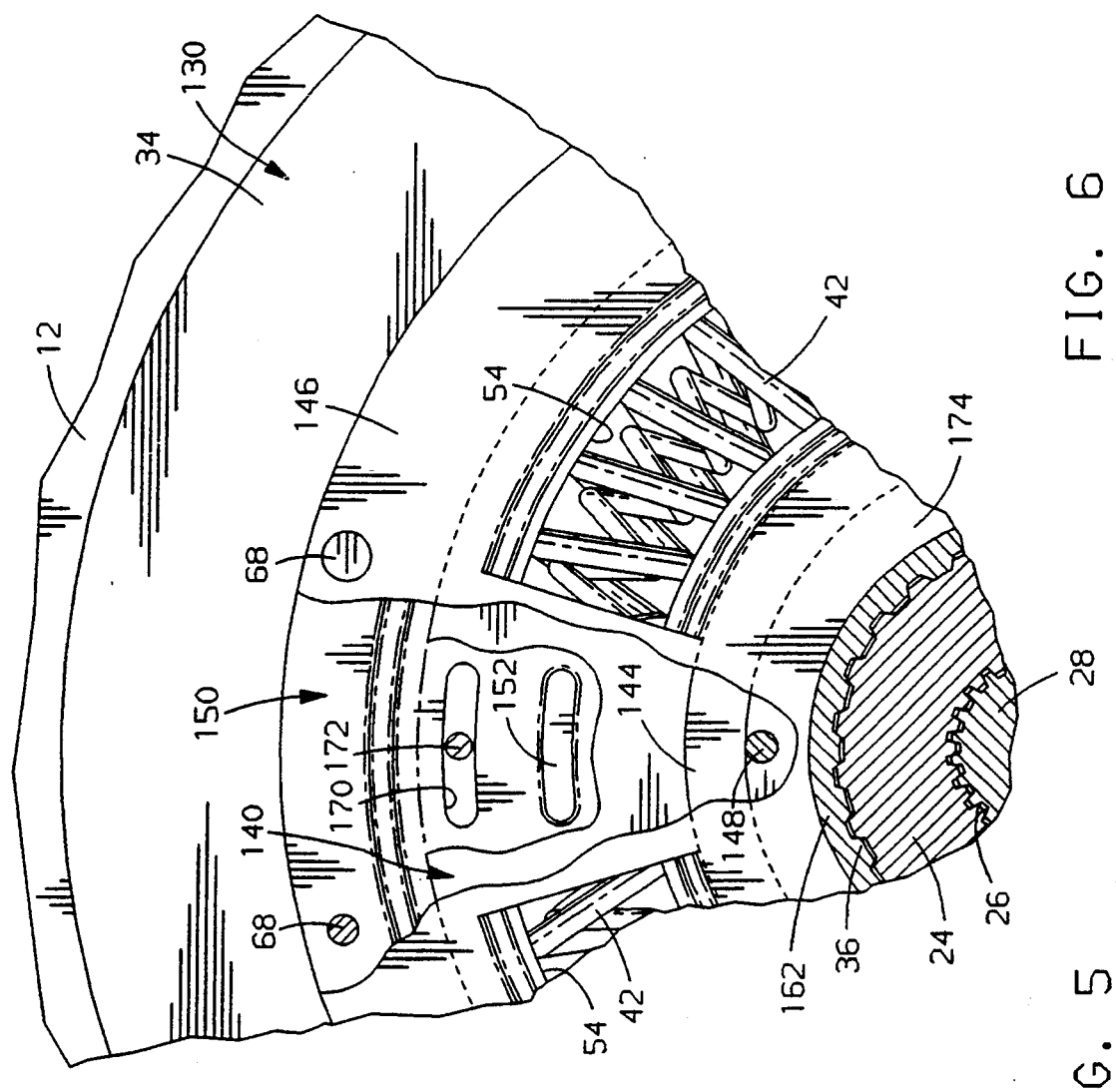
FIG. 6 is a view similar to FIG. 4 showing an end view of the damper shown in FIG. 5.
Figure 5:
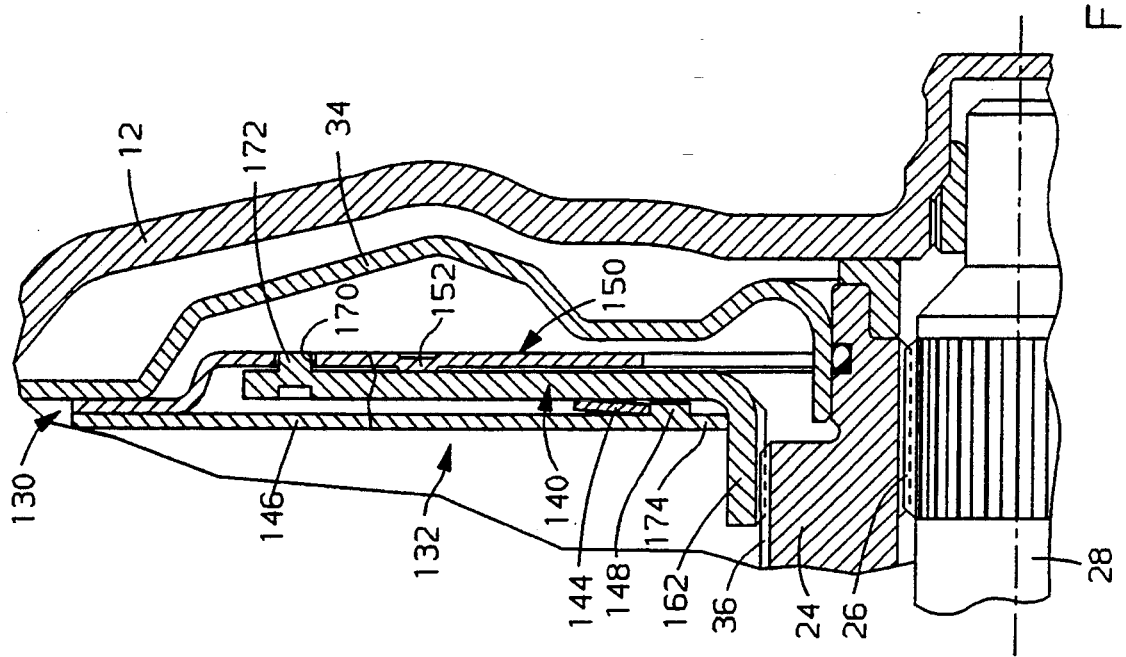
FIG. 5 is a view similar to FIG. 3 depicting an alternate embodiment of the invention.

The embodiment of the damper assembly shown in FIGS. 5 and 6 provides for the forming of the support embossments 148 on the wall 146, while the friction embossments 152 are formed on the wall 150. Thus, the respective embossments are formed at the time of manufacture of the wall components. The wall 150 also has formed therein an oblong window 170 which cooperates with an embossment stop tab 172 formed on the hub 140. These interengaging components are also formed on their respective damper parts at the time of manufacture. Again, the damper assembly will provide for the necessary hysteresis frictional components and angular excursion stop members without the need for extraneous components nor added manufacturing steps.

Figure 8:
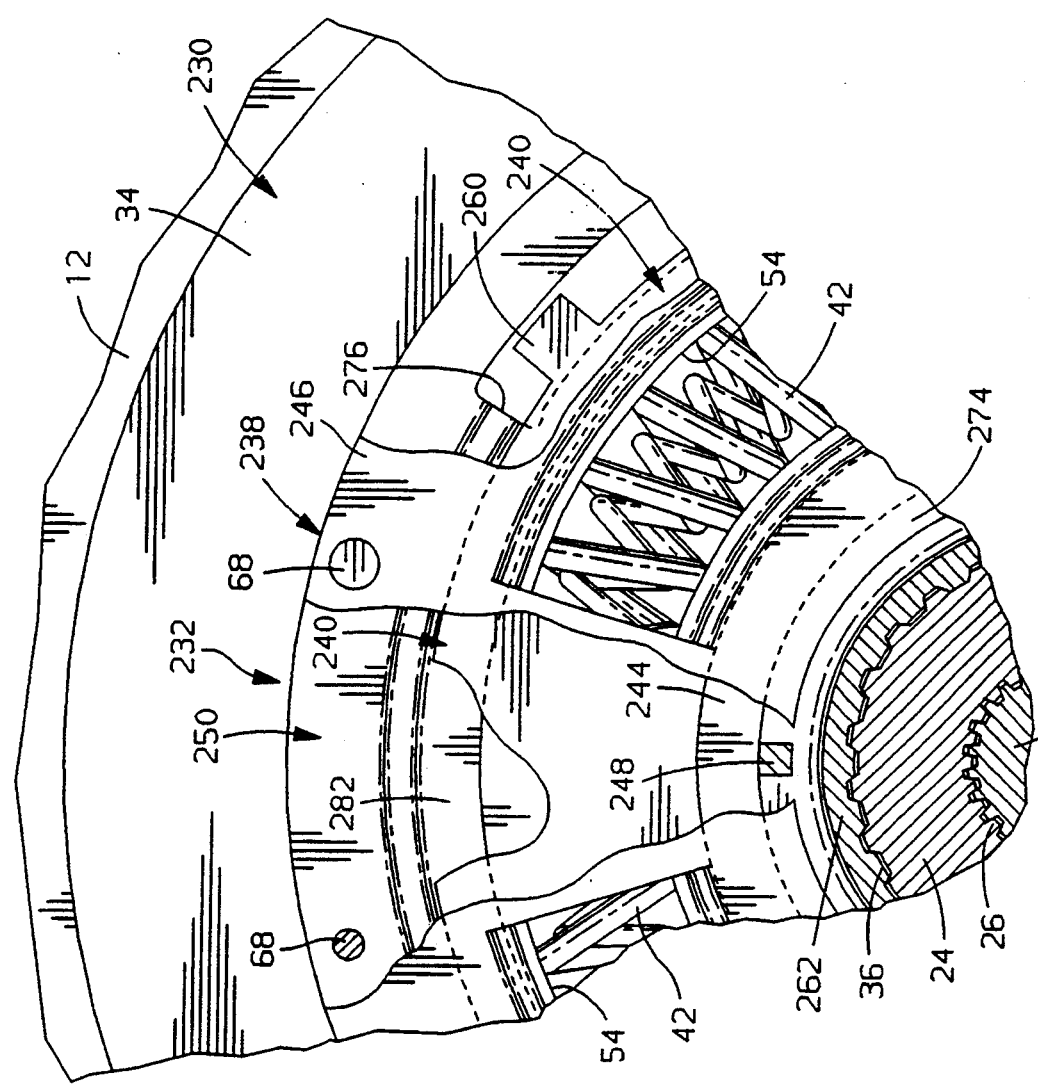
FIG. 8 is an end view of the embodiment shown in FIG. 7.
Figure 7:
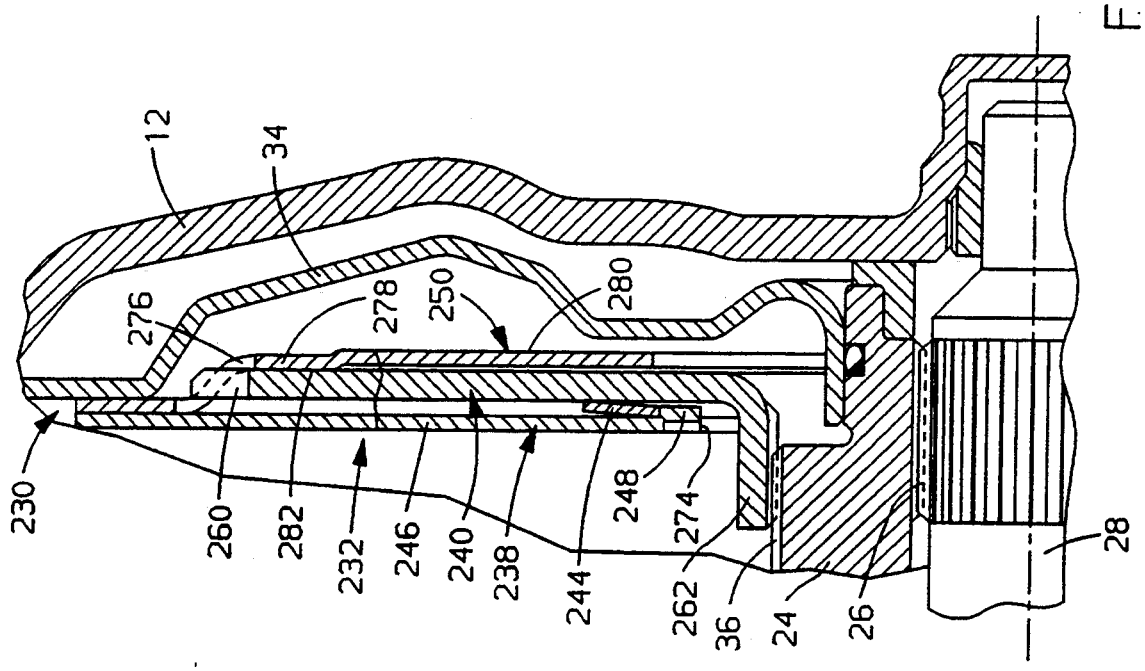
FIG. 7 is a view similar to FIG. 3 showing another alternative embodiment of the present invention.

Another embodiment is shown in FIGS. 7 and 8. In this embodiment, the support embossments 248 are formed at the inner periphery 274 of the wall 246. The wall 250 has a plurality of windows 276 formed therein which cooperate with tabs 260 formed at the outer periphery of the hub 240. The wall 250 also has a portion 278 of the periphery radially inward of the window 276 formed offset from a wall portion 280 to provide for an annular frictional surface 282 which will cooperate with the hub 240 as a result of the load applied to the hub 240 by the washer spring 244.

As with the embodiments described above for FIGS. 3 and 5, the embodiment of the damper assembly in FIG. 7 also has the necessary components for frictional hysteresis and angular excursion stops established in the respective components at the point of manufacture.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A friction clutch and damper comprising:
   a damper input;
   a damper output;
   spring means disposed between said damper input and damper output for providing a resilient connection therebetween;
   one of said damper input and said damper output comprising a spring cage providing a housing for said spring means;
   the other of said damper input and said damper output comprising a drive hub;
   spring support defined by a plurality of embossments on one of said spring cage and drive hub;
   a washer spring supported on and positioned by said spring support for providing a hysteresis force;
   hysteresis friction members for providing frictional hysteresis defined by an embossment on one of said drive hub and spring cage and being urged into frictional engagement by said washer spring with a wall on the other of said drive hub and spring cage; and drive tabs formed on one of said drive hub and spring cage and being disposed in slots formed in the other of said drive hub and spring cage for cooperation therewith to limit angular excursion between said damper input and damper output to a predetermined angle.

2. A friction clutch and damper comprising:

a spring cage comprising a pair of spaced walls and spring windows formed in said spaced walls;

a drive hub comprising a wall portion disposed between said walls of said spring cage and having spring windows formed therein alignable with the spring windows in said spring cage;

spring means disposed in each of said spring windows in said spring cage and said drive hub for providing a resilient drive connection between said spring cage and said drive hub;

spring supports defined by a plurality of embossments on said spring cage;

a washer spring having an inner diameter supported on and radially positioned by said spring supports;

hysteresis friction members for providing hysteresis friction defined by an embossment on the wall of said drive hub and said embossment of said drive hub being urged into frictional engagement with one of the walls of said spring cage by said washer spring;

and drive tabs formed on one of said drive hub and said spring cage and being disposed in slots formed in the other of said drive hub and said spring cage for cooperating therewith to limit angular excursion between said drive hub and said spring cage to a predetermined angle.

3. A friction clutch and damper comprising:

a spring cage having a pair of spaced walls and spring windows formed in said spaced walls;

a drive hub having a wall portion disposed between said walls of said spring cage and having spring windows formed therein alignable with the spring windows in said spring cage;

spring means disposed in each of said spring windows in said spring cage means and said drive hub means for providing a resilient drive connection between said spring cage and said drive hub;

a spring support defined by a plurality of embossments on said spring cage;

a washer spring having an inner diameter supported on and radially positioned by said spring support;

hysteresis friction members defined by an embossment on one of the walls of said spring cage and said wall of said drive hub being urged into frictional engagement with the embossment of said spring cage by said washer spring;

and a plurality of drive tabs formed on one of said drive hub and said spring cage and being disposed in respective slots formed in the other of said drive hub and said spring cage in cooperating relation therewith to limit angular excursion between said spring cage and said drive hub to a predetermined angle.

* * * * *